(12) United States Patent
Harrison et al.

(10) Patent No.: US 11,146,062 B2
(45) Date of Patent: Oct. 12, 2021

(54) METHOD AND APPARATUS FOR IMPROVING PV MODULE FILL FACTOR USING A VOLTAGE CLAMPING CIRCUIT

(71) Applicant: Enphase Energy, Inc., Petaluma, CA (US)

(72) Inventors: Michael Harrison, Petaluma, CA (US); Erik Weyker, Sebastopol, CA (US); Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 1193 days.

(21) Appl. No.: 14/249,465

(22) Filed: Apr. 10, 2014

(65) Prior Publication Data
US 2014/0306541 A1    Oct. 16, 2014

Related U.S. Application Data

(60) Provisional application No. 61/810,816, filed on Apr. 11, 2013.

(51) Int. Cl.
| | |
|---|---|
| *H02J 1/00* | (2006.01) |
| *H02J 3/00* | (2006.01) |
| *H02J 7/00* | (2006.01) |
| *H02J 3/38* | (2006.01) |

(52) U.S. Cl.
CPC ............ *H02J 1/00* (2013.01); *H02J 3/383* (2013.01); *H02J 7/0019* (2013.01); *Y02E 10/56* (2013.01)

(58) Field of Classification Search
CPC .. H02J 1/00; H02J 7/0019; H02J 3/383; H02J 3/381; H02J 2300/24; Y02E 10/563; Y02E 10/56; Y10T 307/685

USPC ........................................................... 307/77
See application file for complete search history.

(56) References Cited

U.S. PATENT DOCUMENTS

| | | | | |
|---|---|---|---|---|
| 5,914,590 | A * | 6/1999 | Wacknov | H02M 3/1563 323/282 |
| 2007/0236187 | A1 | 10/2007 | Wai et al. | |
| 2009/0225574 | A1* | 9/2009 | Fornage | H02M 3/335 363/123 |
| 2010/0236612 | A1* | 9/2010 | Khajehoddin | G05F 1/67 136/252 |
| 2011/0109285 | A1 | 5/2011 | El-Barbari et al. | |
| 2011/0198935 | A1 | 8/2011 | Hinman et al. | |
| 2012/0230066 | A1* | 9/2012 | Lai | H02M 7/4807 363/37 |
| 2013/0049710 | A1* | 2/2013 | Kraft | H01L 31/02021 323/223 |
| 2013/0094112 | A1* | 4/2013 | Burghardt | H01L 31/02021 361/42 |

OTHER PUBLICATIONS

PCT Search Report and Written Opinion, PCT/US2014/033589, 10 Pages, dated Aug. 18, 2014.

* cited by examiner

*Primary Examiner* — Richard Tan
(74) *Attorney, Agent, or Firm* — Moser Taboada

(57) ABSTRACT

A method and apparatus for voltage clamping including: measuring a DC voltage across the PV module at an input of a power converter, comparing the measured DC voltage to the overvoltage threshold, determining the measured DC voltage exceeds the overvoltage threshold, and operating a clamping circuit to clamp at least a portion of the DC voltage prior to input to the power converter.

17 Claims, 4 Drawing Sheets

METHOD AND APPARATUS FOR IMPROVING PV MODULE FILL FACTOR USING A VOLTAGE CLAMPING CIRCUIT

CROSS-REFERENCE TO RELATED APPLICATION

This application claims priority to U.S. Provisional Patent Application No. 61/810,816 filed on Apr. 11, 2013, which is incorporated by reference herein in its entirety.

BACKGROUND OF THE INVENTION

Field

Embodiments of the present disclosure relate generally to power conversion, and, in particular, to controlling output voltage from a photovoltaic (PV) module.

Description of the Related Art

In power generation, distributed generators such as photovoltaic (PV) panels or modules that produce DC voltage are often coupled to a converter. The converter will convert the generated DC power to AC power and couple the AC power to the AC grid. A key performance parameter for a PV module is the fill factor. The fill factor is a ratio of the actual maximum obtainable power to a product of an open-circuit voltage and short-circuit current. The open-circuit voltage and short-circuit current are the respective maximum voltage and current for a PV module and thus the fill factor is used to determine the voltage margin that needs to be provided by any converter that will be supplied by the power generated by the PV module.

In addition, the PV modules are conventionally connected in series to produce a relatively high output voltage. This voltage is applied across the switching circuitry of the converter that typically includes an input capacitor. The voltage generated by the PV modules in some instances may be undesirably too high (e.g., an overvoltage condition), and conventionally requires the full output power from the PV module to be dissipated by the conversion circuitry. Thus, the input capacitor and associated input circuitry in the converter must include expensive components that are capable of tolerating voltages across a large voltage range (also known as margin).

Therefore, there is a need in the art for a method and apparatus for improving voltage margins while avoiding overvoltage conditions and improving the fill factor.

SUMMARY OF THE INVENTION

Embodiments of the present invention generally relate to a method and apparatus for improving PV module fill factor with a voltage clamping circuit such as to maintain an input voltage value of the PV module below an open circuit voltage value as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention include a method, apparatus, and system for improving fill factor of a photovoltaic (PV) module. The fill factor is improved by a voltage clamping circuit that reduces the amount of generated input voltage ($V_{IN}$) generated by a PV module and input to a power converter. By locating the clamping circuit between the PV module and a respective power converter, the anticipated input voltage margin of the converter is lowered. Thus input components (e.g., capacitors, resistors, and the like) may be reduced, resulting in cost and space savings within the converter. In some embodiments, the clamping circuit is located external to the PV module and the power converter. In other embodiments, the clamping circuit is located as included within the housing (e.g., within a junction box) the of PV module. Further embodiments may also include the clamping circuit as integrated within the power converter circuit and housing.

Figure 1:
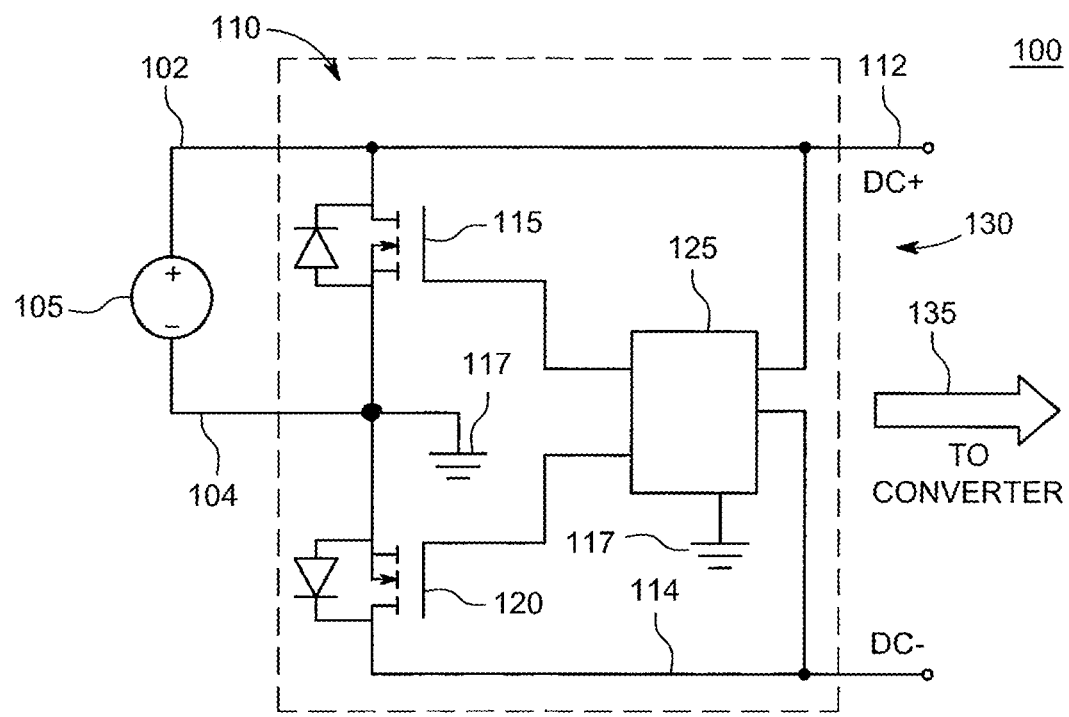
FIG. 1 is a schematic diagram of an exemplary voltage clamping circuit for a single PV module in accordance with an embodiment of the present invention.

FIG. 1 is a schematic diagram 100 of an exemplary voltage clamping circuit 110 for a single PV module 105 in accordance with an embodiment of the present invention. The voltage clamping circuit 110 comprises a first switch 115 (e.g., a MOSFET transistor), a second switch 120, and a hysteresis controller 125. The hysteresis controller 125 is coupled across the output port 130 and to ground 117. The output port 130 comprising a first output leg 112 and a second output leg 114.

The hysteresis controller 125 monitors the voltage $V_{IN}$ and controls the switches (115 and 120) so as to prevent overage voltages from being applied across a power converter (hereinafter "converter") 135. In some embodiments, the hysteresis controller 125 may include a voltage sampler (not shown). In some embodiments the hysteresis controller 125 may be a separate microcontroller and in other embodiments may comprise a group of logic controllers (e.g., integrated circuit (IC) logic gates, comparators, and the like). In other embodiments still, the hysteresis controller 125 may comprise logic from a controller that is commonly shared and found in the converter 135.

A source and drain of the first switch 115 is coupled across the output of the PV module 105. The drain of the first switch 115 is coupled to a first output terminal 102 of the PV module 105 that forms leg 112 and the source is coupled to a second output terminal 104 of the PV module 105 and coupled to ground 117 and a source of the second switch 120.

The source of the second switch 120 is coupled to the second terminal 104 of the PV module 105 and ground 117 and the drain of the second switch 120 is coupled to the second output leg 114. Both the first switch 115 and second switch 120 are controlled by the hysteresis controller 125.

Voltage generated by the PV module 105 is coupled to the voltage clamping circuit 110. The voltage clamping circuit 110 then outputs voltage via an output port 130 to a converter 135. The converter 135 includes a storage capacitor (not shown) that limits the rate of voltage change to provide adequate time for the control circuitry (hysteresis controller 125) to detect a pending over voltage based on the observed rate of voltage change.

In some embodiments, the clamping circuit 110 is integrated with the converter 135. In other embodiments, the clamping circuit 110 may be an independent circuit coupling power from the PV module 105 to the converter 135. In even further embodiments, the voltage clamping circuit 110 may be integrated into the PV module/panel (e.g., in junction box or in panel). In such an embodiment, the PV panel is capable of monitoring and avoids over voltage conditions without additional external circuitry. In addition, the embodiments disclosed herein with the clamping circuit allows PV modules of higher output voltage (e.g., 72 cell panels) to be operated with converters configured for a lower input voltage (e.g., 60 cell panels).

The hysteresis controller 125 allows voltage coupled to the converter 135 to be set between upper and lower limits as determined by the hysteresis controller 125. For example, in a first overvoltage mode when the hysteresis controller 125 determines that the voltage at port 130 from the PV module 105 is about to or is exceeding a threshold (e.g., upper limit), the first switch 115 will be turned ON (e.g., closes the switch). By turning ON the first switch 115, the PV module 105 is directly short circuited. Prior to closing the first switch 115, the second switch 120 is turned OFF (e.g., opens the switch). Such a switching order prevents the full voltage of the PV module 105 from being coupled to the converter 135. By first turning OFF the second switch 120, the port 130 and subsequently, the converter 135 is isolated from the short circuited applied to the PV module 105. As mentioned above, the converter 135 may comprise an input capacitor and with no power delivered from the PV module 105 in the first mode, the input voltage to converter 135 on the capacitor will reduce quickly at port 130.

In a second mode, once the voltage across port 130 is determined to be at sufficiently low threshold, the switches (115 and 120) are returned to normal operating states. The first switch 115 is opened just prior to the second switch 120 being closed. During normal operation, the first switch 115 is kept in the OFF position and the second switch 120 is kept in the ON position such that power is delivered from the PV module 105 to the converter 135. By toggling the switches between the first and second modes, the voltage clamping circuit 110 modifies the input voltage $V_{IN}$ to be maintained to a minimum clamping voltage value $V_{CL}$.

Figure 2:
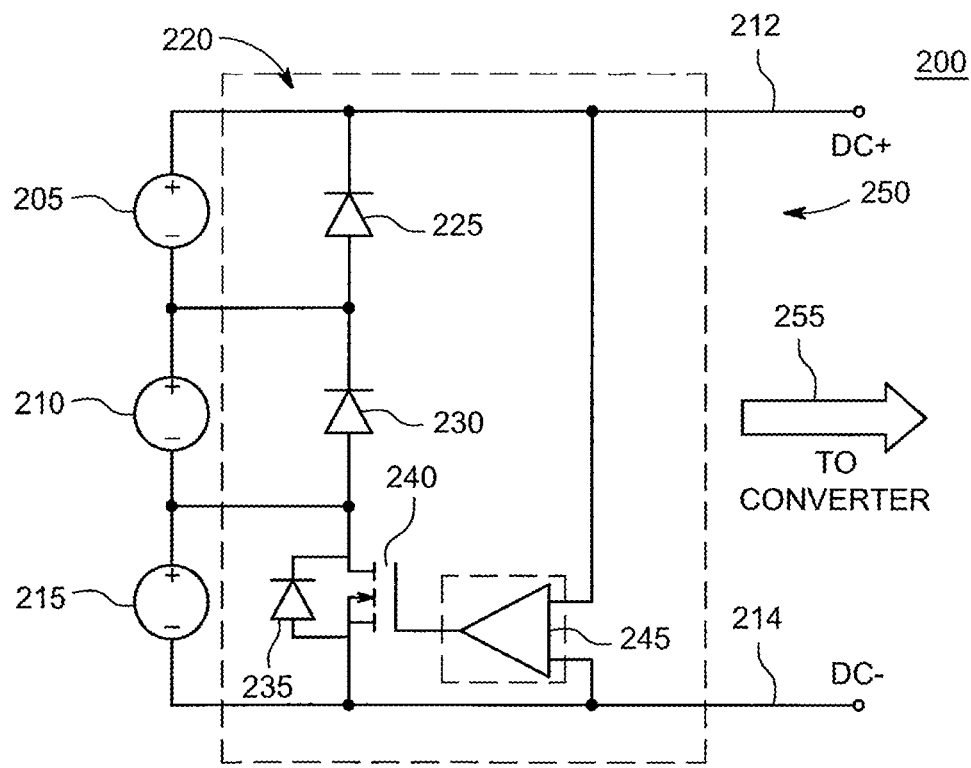
FIG. 2 is a schematic diagram of an exemplary voltage clamping circuit located within the PV module in accordance with an embodiment of the present invention.

FIG. 2 is a schematic diagram of an exemplary voltage clamping circuit 220 located within the PV module 200 in accordance with an alternative embodiment of the present invention.

The voltage clamping circuit 220 comprises a bypass diodes (225, 230, 235), at least one switch 240 coupled across a bypass diode (e.g., diode 235) and control logic 245.

In some embodiments, the bypass diode 235 may be the body diode of the switch 240 (e.g., a transistor). The voltage clamping circuit 220 is coupled to the output port 250 comprising a first DC output leg 212 and a second DC output leg 214. The control logic 245 represents numerous controllers or logic ICs as discussed above with respect to FIG. 1 for controlling the clamping circuit 110 is similarly applied to that for clamping circuit 220.

The voltage clamping circuit 220 is exemplary depicted for multiple substrings of PV cells (205, 210, 215) in accordance with an embodiment of the present invention. The diagram depicts a single PV module split into three smaller substrings (205, 210, 215) coupled in series with bypass diodes (225, 230, 235) placed across equal increments of cells (e.g., 20 cells to each diode, for a 60 cell module). By including the voltage clamping circuit across a given number cells, the voltage $V_{IN}$ generated and input to the converter 255 may be finely controlled to prevent applying an overvoltage condition such that only a portion of the PV cells are generating power.

In other embodiments, the substrings (205, 210, 215) may represent three full 60-cell PV modules. In some embodiments, the diodes (225, 230, 235) are integrated into the voltage clamping circuit 220. In other embodiments, the diodes (225, 230, 235) are formed as part of the PV modules in a junction box.

In the depicted embodiment, a transistor 240 with an inherent body diode 235 is connected across the third substring of PV cells 215. The transistor 240 is controlled by logic 245 to operatively turn the transistor 240 ON or OFF depending on the measured overall output across the output port 250. The logic 245 is coupled to the output port 250 and may comprise a comparator integrated circuit, microcontroller, and the like. Similarly as in FIG. 1, the transistor is turned ON and short circuits the third substring of PV cells 215 when an overage voltage is detected at the output port 250. However, since only one of three substrings of PV cells is short circuited, the first and second substrings of PV cells (205 and 210) may still generate voltage and the overall output is reduced to a fraction (e.g., ⅔) of the pre-shorted circuit voltage condition. Thus the voltage clamping circuit 220 eliminates the need for a second switch and the conductions losses that would be incurred within the device.

As with the embodiment in FIG. 1, the logic 245 selects an upper limit and lower limit for which the input capacitor of the converter 135 is operating. The logic 245 allows the input capacitor of the converter 255 to be maintained at a minimum clamping voltage $V_{CL}$. The voltage clamping range may be based on the operational range of the converter 255.

In alternative embodiments, additional transistors or switches may be placed across the remaining diodes (225 and 230) to increase fine control of the PV module output. In further embodiments, "smart bypass diodes" may be used in place of transistors across diodes. Smart bypass diodes allow synchronous rectification that effectively replace diodes with actively controlled switches such as power MOSFETs. Such smart diodes may actively allow current to pass with a smaller forward voltage drop while generating less heat.

Figure 3:
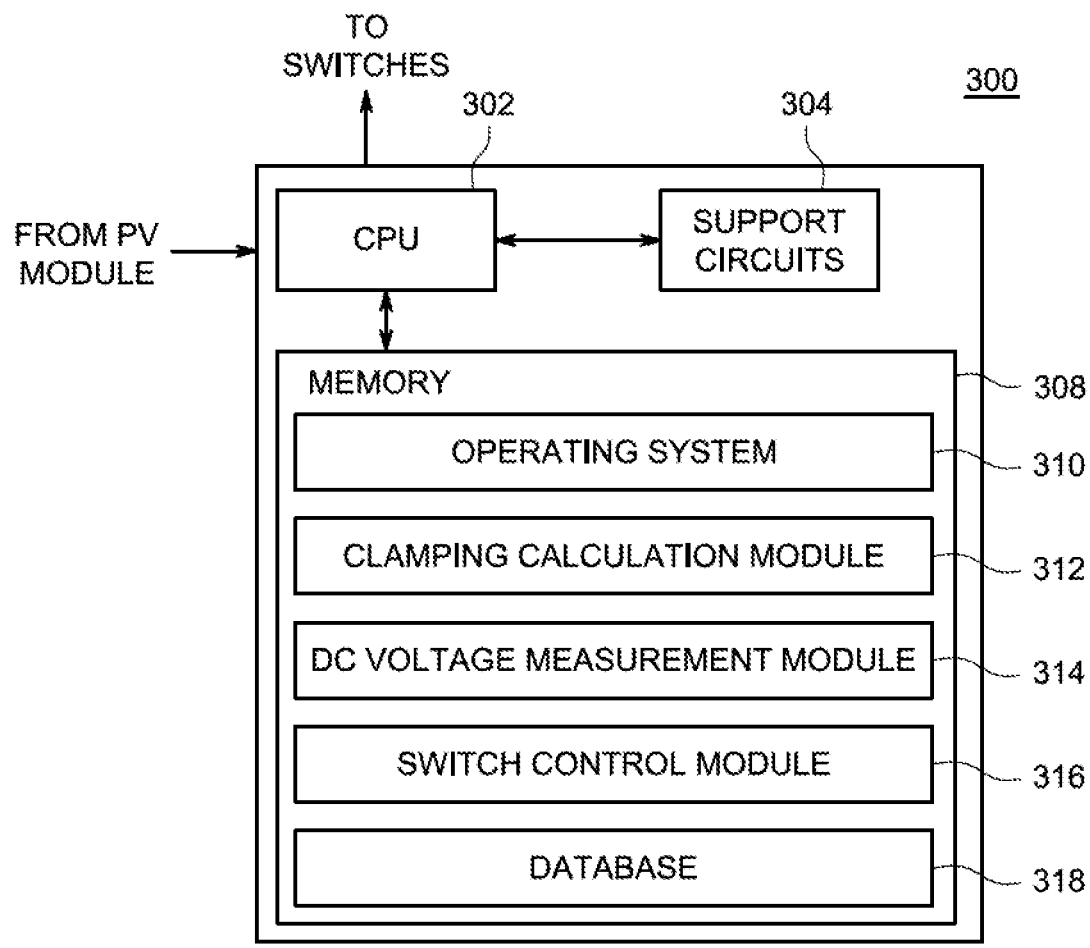
FIG. 3 is an exemplary controller operating the clamping circuit depicted above in FIGS. 1 and 2 in accordance with an embodiment of the present invention.

FIG. 3 is an exemplary controller 300 operating the clamping circuit depicted above in FIGS. 1 and 2 in accordance with an embodiment of the present invention. The controller 300 may comprise the hysteresis controller 125 or the logic 245. The controller 300 comprises a central processing unit (CPU) 302, support circuits 304, and memory 308. The CPU 302 may be any commercially available processor, microprocessor, microcontroller, and the like. In other embodiments, the CPU 302 is a microcontroller such as a PIC. The support circuits 604 comprise well known circuits that provide functionality to the CPU 302 such as clock circuits, communications, cache, power supplies, I/O circuits, and the like.

The memory 308 may be any form of digital storage used for storing data and executable software. Such memory includes, but is not limited to, random access memory, read only memory, disk storage, optical storage, and the like. The memory 308 stores computer readable instructions corresponding to: a clamping calculation module 312, DC voltage measurement module 314, and switch control module 316. Additional embodiments may include an operating system 310 and one or more databases 318 stored in memory 308.

The DC voltage measurement module 314 samples the voltage $V_{IN}$ output from the PV module (e.g., PV module 105). In other embodiments, the voltage clamping circuit 110 may include a voltage sampler that includes analog-to-digital circuitry for sending voltage samples as digital data to the controller 300. The DC voltage measurement module 314 is coupled to the clamping calculation module 312. In other embodiments, the DC voltage measurement module 314 may also measure the voltage across the input capacitor of the converter 135.

The switch control module 316 is coupled to the clamping calculation module 312 and operates the switches in the clamping circuit (e.g., first switch 115, second switch 120 in FIG. 1 and switch 240 in FIG. 2). In some embodiments, the switch control module operates the switches using pulse width modulation (PWM).

The clamping calculation module 312 obtains the $V_{IN}$ value determined by the DC voltage measurement module 314 and compares the $V_{IN}$ value to a first threshold. The first threshold may be a predetermined value indicating an overvoltage condition $V_{OVER}$. If the $V_{IN}$ value exceeds the $V_{OVER}$ value, an over voltage condition exists or is imminent and the switch control module 316 is instructed to close switch 115 and open switch 120 in the clamping circuit 110. Similarly, for clamping circuit 220, the switch 240 will be opened. The clamping calculation module 312 then waits for a predetermined period of time for the charge across the input capacitor of the converter 135 to dissipate before returning to normal operation. In normal operation, the switch control module 316 is instructed to open switch 115 and close switch 120 in the clamping circuit 110. Similarly, for clamping circuit 220, the switch 240 will be closed. By returning to normal operation, the clamping circuit maintains a minimum clamping voltage $V_{CL}$ for the voltage value $V_{IN}$. In some embodiments, the clamping voltage value $V_{CL}$ is a predetermined value based on the power converter 135 and/or PV module 105 specifications (e.g., a higher rated PV panel would have a higher $V_{CL}$ value In other embodiments, following an overvoltage detection, the clamping calculation module 312 monitors the voltage across the input capacitor as being above a second threshold. The second threshold corresponding to the minimum clamping voltage $V_{CL}$. Upon determining the $V_{IN}$ value is below $V_{CL}$, the clamping calculation module 312 instructs the switch control module 316 to resume normal operation. Otherwise, the clamping calculation module 312 maintains a $V_{CL}$ bias across the PV module.

Figure 4:
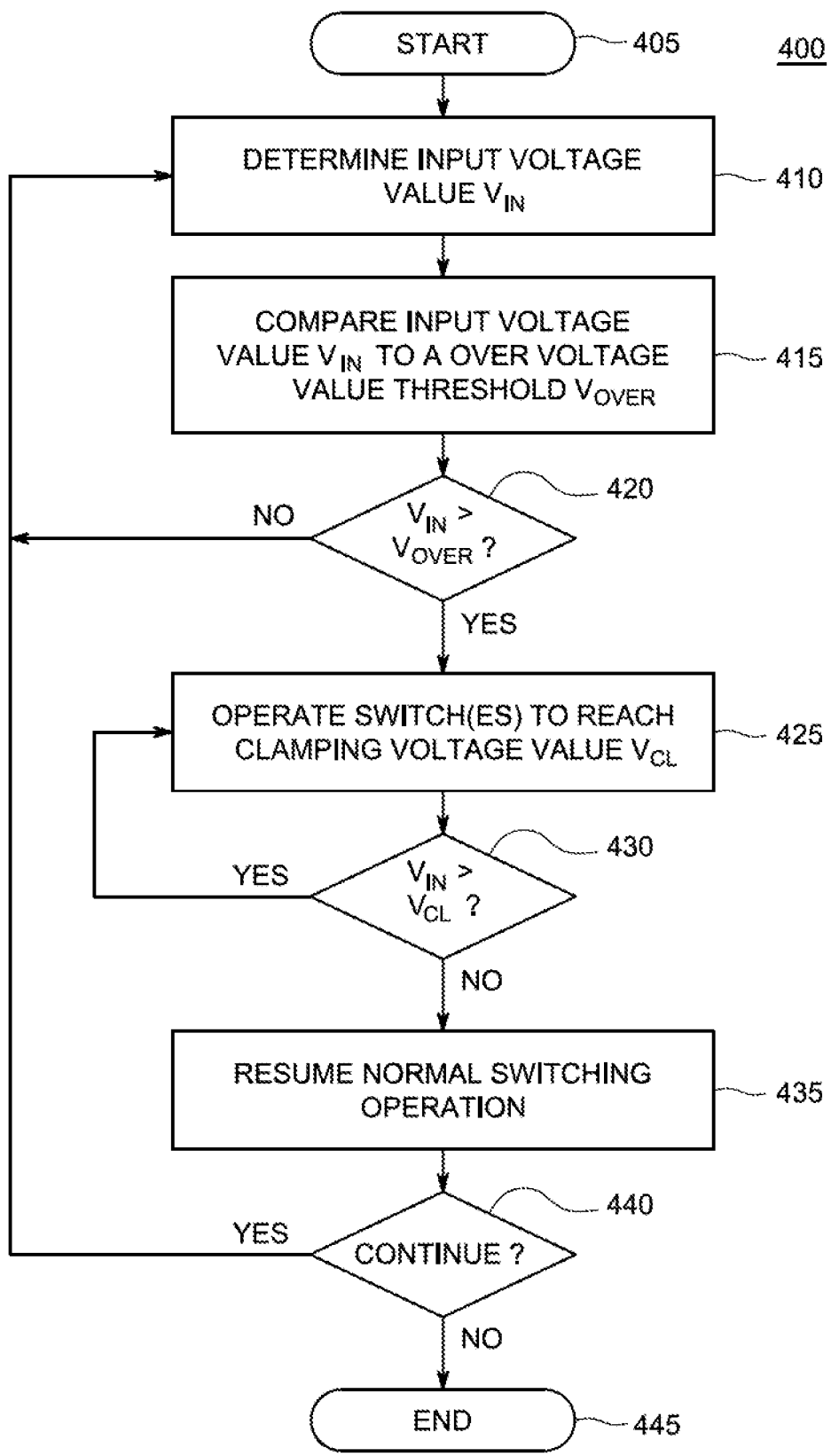
FIG. 4 is a flow diagram of an exemplary method for operating the voltage clamping circuit in accordance with an embodiment of the present invention.

FIG. 4 is a flow diagram of an exemplary method 400 for operating the voltage clamping circuit in accordance with an embodiment of the present invention. The method 400 may be implemented by the circuits and devices described above with respect to FIGS. 1-3.

The method 400 begins at step 405 and continues to step 410. At step 410, the input voltage value $V_{IN}$ from a PV module (e.g., PV module 105) to the power converter 135 is determined by a controller (e.g., hysteresis controller 125). The method 400 then continues to step 415.

At step 415, the input voltage value $V_{IN}$ is compared to a first threshold. The first threshold may be the over voltage value threshold $V_{OVER}$ that is a predetermined maximum value indicating an overvoltage condition.

Next, at step 420, the method 400 determines whether the input voltage value $V_{IN}$ exceeds the voltage value threshold $V_{OVER}$. If the input voltage value $V_{IN}$ is below the voltage value threshold $V_{OVER}$, the method returns to step 410. If however, the input voltage value $V_{IN}$ exceeds the voltage value threshold $V_{OVER}$, the method 400 proceeds to step 425.

At step 425, the switches (e.g., switch 115 and switch 120) are operated to temporarily close switch 115 and open switch 120 to interrupt power delivery from the PV module (e.g., PV module 105) to the power converter (e.g., power converter 135). The temporary cessation of power allows the input capacitor of the power converter to discharge.

Next at step 430, the method 400 determines whether the input voltage value $V_{IN}$ exceeds a second threshold value. The second threshold value is a clamping voltage value and the method returns to step 425 to continue operating the switches until the clamping voltage value $V_{CL}$ is reached. When the method 400 determines the input voltage value $V_{IN}$ is less than the clamping voltage value $V_{CL}$, the method 400 proceeds to step 435.

At step 435, the switches are returned to normal operation. In normal operation, the power generated from the PV module is fully delivered to the power converter. Thus, for example in FIG. 1, switch 115 is opened while switch 120 is closed. In an alternative embodiment, switch 240 in FIG. 2 is opened. The method 400 continues to step 440 to determine whether the method 400 should continue.

At step 440, if the method 400 is to continue, the method 400 returns to step 410. If however, the method 400 is not to continue, the method 400 proceeds to step 445 and ends.

Figure 5:
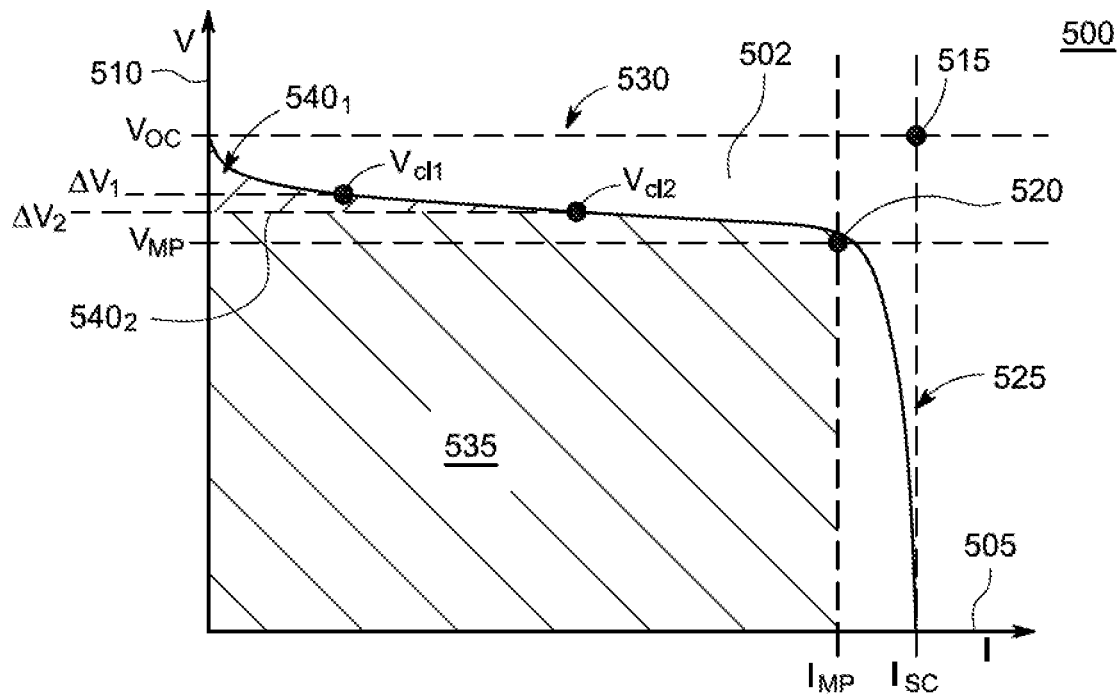
FIG. 5 is an exemplary I-V graph depicting improved fill factor in accordance with an embodiment of the present invention.

FIG. 5 is an exemplary I-V graph 500 in accordance with an embodiment of the present invention. The graph 500 depicts an exemplary I-V curve 502 of a PV module. The graph 500 comprises a current 505 versus voltage 510. The curve 502 includes a maximum power point 520 derived from the actual maximum voltage point $V_{MP}$ and the actual maximum current point $I_{MP}$. The theoretical maximum point 515 is formed from the intersection of the open circuit voltage $V_{OC}$ and the short circuit current $I_{SC}$.

The area under the curve represented by 535 is often compared to the area of the theoretical maximum power point 515. Thus, areas (525, 530, 535) comprise the fill factor of the PV module.

$$\text{Fill Factor} = \frac{V_{MP} \times I_{MP}}{V_{OC} \times I_{SC}} \qquad (1)$$

In the aforementioned embodiments, the voltage margin (depicted here as area 540 comprising $\Delta V_1$, and $\Delta V_2$) is clamped to $V_{cl1}$ or $V_{cl2}$ to improve the fill factor ratio given by equation 1. Respective clamp voltages may be those obtained from implementing the circuits found in FIGS. 1 and 2 such that voltages are clamped to a particular voltage on the curve 502 away from the open circuit voltage $V_{OC}$. Thus improving and expanding the operating area 535 of the PV module defined by the maximum obtainable power point 530 and preventing overvoltage conditions. The voltage margin eliminates inefficient operating conditions such as the area portion $540_1$ and $540_1$ under the curve 502 near $V_{OC}$.

Figure 6:
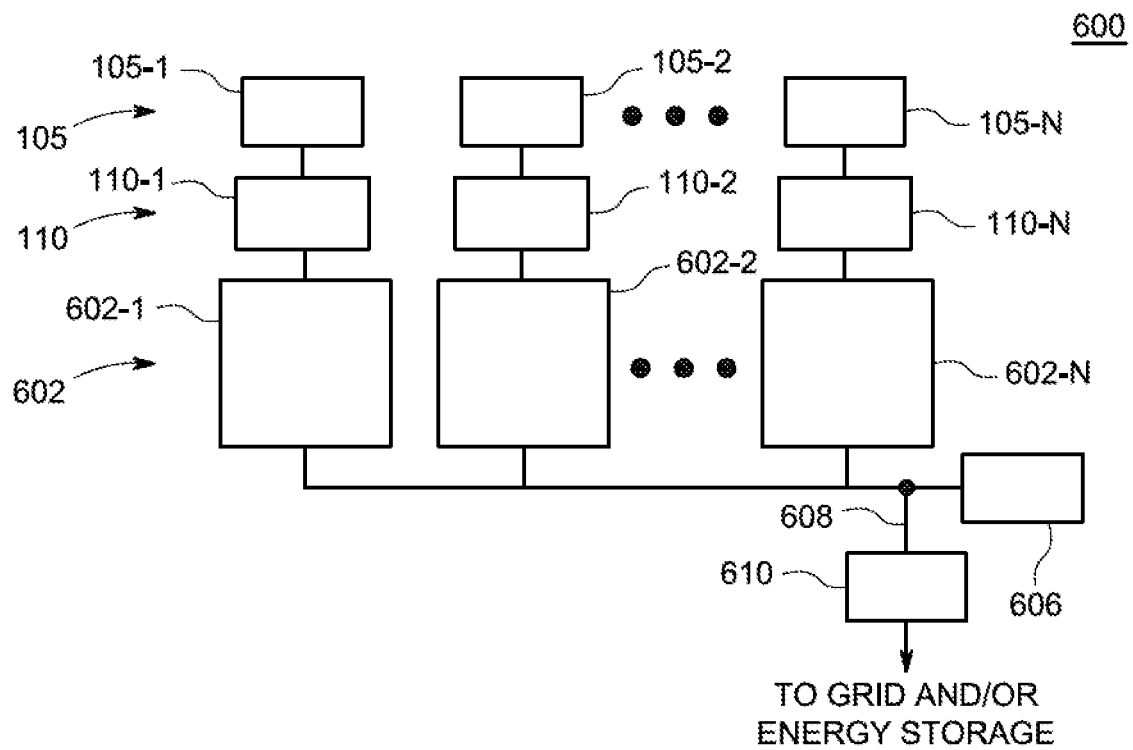
FIG. 6 is a block diagram of a system for power conversion comprising one or more embodiments of the present invention.

FIG. 6 is a block diagram of a system 600 for power conversion comprising one or more embodiments of the present invention. This diagram only portrays one variation of the myriad of possible system configurations and devices that may utilize the present invention. The present invention can be utilized in any system or device that uses a resonant converter for DC-AC or AC-DC power conversion.

The system 600 comprises a plurality of power converters 602-1, 602-2 . . . 602-N, collectively referred to as power converters 602; clamping circuits 110-1, 110-2, 110-N, collectively referred to as clamping circuits 110; a plurality of DC power sources 105-1, 105-2 . . . 105-N, collectively referred to as DC power sources 105; a system controller 606; a bus 608; and a load center 610. The DC power sources 106 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each power converter 602-1, 602-2 . . . 602-N is coupled to a single clamping circuit 110-1, 110-2 . . . 110-N that is coupled to a single DC power source 105-1, 105-2 . . . 105-N, respectively; in some alternative embodiments, multiple DC power sources 105 may be coupled to a single power converter 602, for example a single centralized power converter 602. Each of the clamping circuits 110 may comprise the clamping circuit described above with respect to FIG. 1 or FIG. 2. In some embodiments, the power converters 602 may generate a single phase AC power output; in other embodiments, the power converters 602 may generate a split-phase or three-phase AC output.

The power converters 602 are coupled to the system controller 606 via the bus 608. The system controller 606 is capable of communicating with the power converters 602 by wireless and/or wired communication (e.g., power line communications) for providing operative control of the power converters 602. The power converters 602 are further coupled to the load center 610 via the bus 408.

The power converters 602 are each capable of converting the received DC power to AC power, although in other embodiments the power converters 602 may receive an AC input and convert the received input to a DC output. The power converters 602 couple the generated output power to the load center 610 via the bus 608. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 602 convert the DC input power to AC power that is commercial power grid compliant and couple the AC power to the commercial power grid via the load center 610.

In some alternative embodiments, the power converters 602 may be DC-DC power converters. In additional embodiments, the clamping circuits 110 may be located within the PV module or the power converter 602. The clamping circuits 110 allow the minimum bias across the PV modules 105 to be a clamping voltage value $V_{CL}$ and improved energy production and fill factor for the PV modules 105.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. A method for voltage clamping a photovoltaic (PV) module comprising:
   measuring a DC voltage across an output of the PV module that is coupled across an input of a power converter, wherein the PV module comprises a plurality of substrings of PV cells;
   comparing the measured DC voltage to an overvoltage threshold;
   determining the measured DC voltage exceeds the overvoltage threshold; and
   operating a clamping circuit to clamp the DC voltage, by clamping fewer than all substrings of the plurality of substrings, to a value between an open circuit voltage of the PV module and a maximum power point voltage of the PV module.

2. The method of claim 1, wherein the operating the clamping circuit further comprises returning to a normal operation mode when the DC voltage across the input of the power converter is below a predetermined threshold.

3. The method of claim 2, wherein the normal operation mode comprises conducting the DC voltage from the PV module to the power converter.

4. The method of claim 1, wherein the operating the clamping circuit to clamp the DC voltage comprises, for one or more substrings in the plurality of substrings, closing a switch coupled across the one or more strings, which is fewer than all substrings of the plurality of substrings.

5. The method of claim 1, wherein the clamping circuit comprises (i) for each substring of the plurality of substrings, a switch coupled across the substring, and (ii) a controller for performing the measuring, the comparing, the determining, and the operating.

6. The method of claim 5, wherein, for each substring of the plurality of substrings, the switch is located within a housing of the PV module.

7. The method of claim 6, wherein the controller is located within the housing of the PV module.

8. An apparatus for clamping a voltage of a photovoltaic (PV) module comprising:
   a first switch coupled across a substring of PV cells of a plurality of substrings of PV cells of the PV module; and
   a controller for measuring a DC voltage across an output of the PV module, comparing the measured DC voltage to an overvoltage threshold, determining the measured DC voltage exceeds the overvoltage threshold, and operating the first switch to clamp the DC voltage, by clamping only the substring, to a value between an open circuit voltage of the PV module and a maximum power point voltage of the PV module.

9. The apparatus of claim 8, wherein the operating the first switch further comprises returning to a normal operation mode when the measured DC voltage is below a predetermined threshold.

10. The apparatus of claim 9, wherein the normal operation mode comprises conducting a full DC voltage from the PV module.

11. The apparatus of claim 8, wherein the first switch is located within a housing of the PV module.

12. The apparatus of claim 11, wherein the controller is located within the housing.

13. The apparatus of claim 8, wherein the operating the first switch to clamp the DC voltage comprises closing the first switch.

14. A system for clamping a photovoltaic (PV) module voltage comprising:
- a plurality of PV modules;
- a plurality of power converters coupled to the plurality of PV modules in a one-to-one correspondence; and
- a plurality of clamping circuits, wherein each clamping circuit in the plurality of clamping circuits is integrated with a corresponding PV module of the plurality of PV modules in a one-to-one correspondence, comprising:
  - a first switch coupled across a substring of PV cells of a plurality of substrings of PV cells of the PV module; and
  - a controller for measuring a DC voltage across an output of the PV module, comparing the measured DC voltage to an overvoltage threshold, determining the measured DC voltage exceeds the overvoltage threshold, and operating the first switch to clamp the DC voltage, by clamping the substring, to a value between an open circuit voltage of the PV module and a maximum power point voltage of the PV module.

15. The system of claim 14, wherein the operating the first switch to clamp the DC voltage comprises closing the first switch.

16. The system of claim 15, wherein the operating the first switch further comprises returning to a normal operation mode when the measured DC voltage is below a predetermined threshold.

17. The system of claim 14, wherein the first switch is located within a housing of the PV module.

* * * * *